United States Patent [19]

Haag

[11] 3,969,997
[45] July 20, 1976

[54] SEALED STORAGE UNIT WITH ACCESS

[76] Inventor: Darwin O. Haag, 411 W. Walworth Ave., Elkhorn, Wis. 53121

[22] Filed: Nov. 1, 1974

[21] Appl. No.: 519,991

Related U.S. Application Data

[63] Continuation-in-part of Ser. No. 327,422, Jan. 29, 1973, abandoned.

[52] U.S. Cl. ............................................. 99/646 S
[51] Int. Cl.² .................. A01F 25/18; A01F 25/20; A01F 25/22
[58] Field of Search ...................... 99/646 S, 646 C; 193/34; 52/195, 196

[56] References Cited
UNITED STATES PATENTS

| | | | |
|---|---|---|---|
| 1,050,953 | 1/1913 | Kint | 193/34 X |
| 2,305,423 | 12/1942 | Heaser | 99/646 S |
| 3,182,582 | 5/1965 | Beach | 99/646 S X |
| 3,251,292 | 5/1966 | Vaughan | 99/646 S X |
| 3,459,457 | 8/1969 | Weaver et al. | 99/646 S X |
| 3,494,274 | 2/1970 | Evers | 99/646 S |
| 3,510,319 | 5/1970 | Whitaker | 99/646 S |
| 3,630,001 | 12/1971 | Hamerski | 99/646 S X |
| 3,709,345 | 1/1973 | Price | 193/34 |
| R26,264 | 9/1967 | Beach | 99/646 S |

*Primary Examiner*—Billy J. Wilhite
*Assistant Examiner*—James A. Niegowski
*Attorney, Agent, or Firm*—Neil E. Hamilton

[57] ABSTRACT

A completely sealed silo structure for animal feed which while excluding atmospheric oxygen will permit access by the operator for purposes of maintenance and repair. The sealed silo has the usual pressure compensation means but, instead of the common bottom unloading mechanism, has a top unloader which conveys feed through a sealed chute to the bottom. Sealed access doors are provided for both the feed chute and the service chute as well as between the two chutes.

2 Claims, 6 Drawing Figures

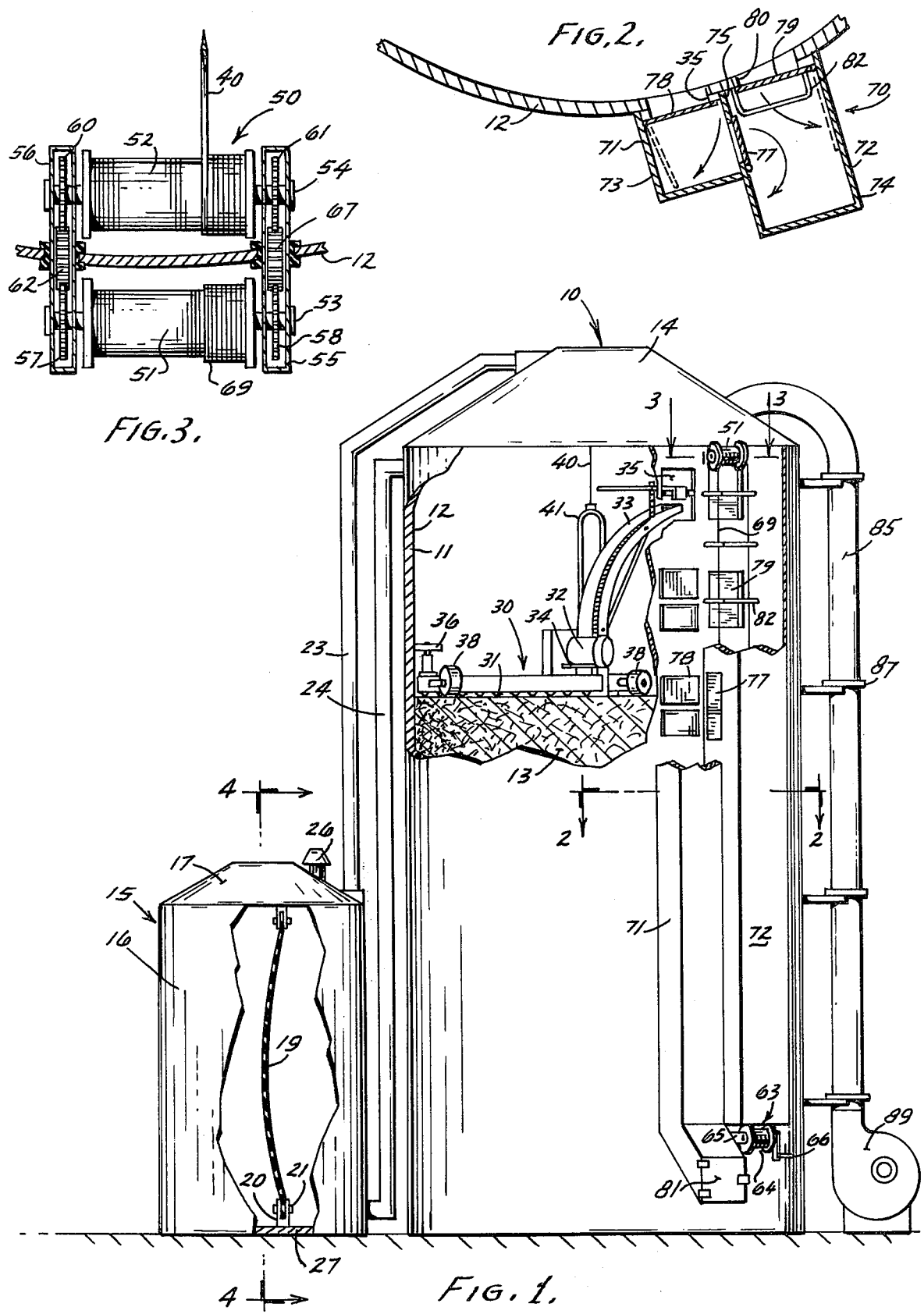

U.S. Patent   July 20, 1976   Sheet 2 of 2   3,969,997
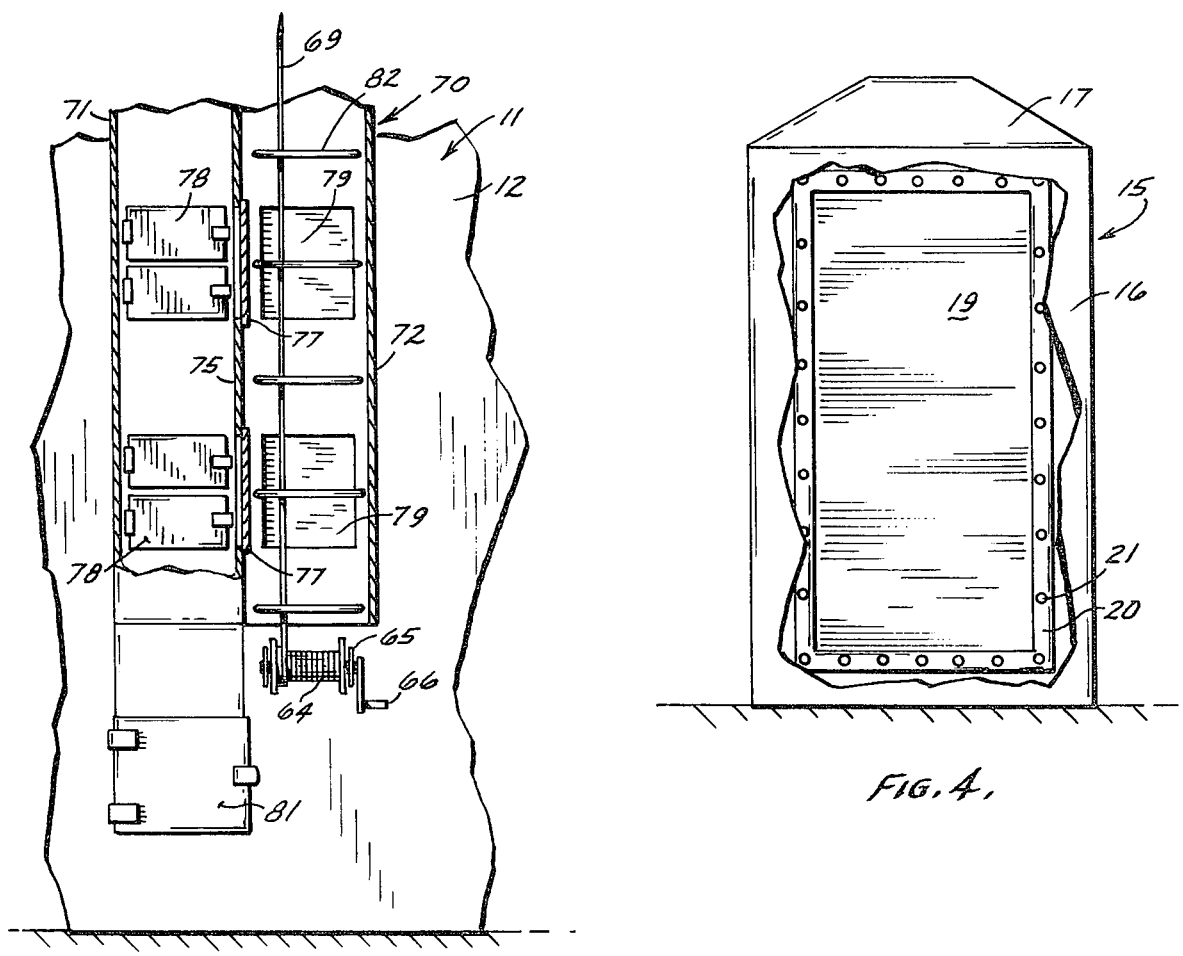
FIG. 5.
FIG. 4.
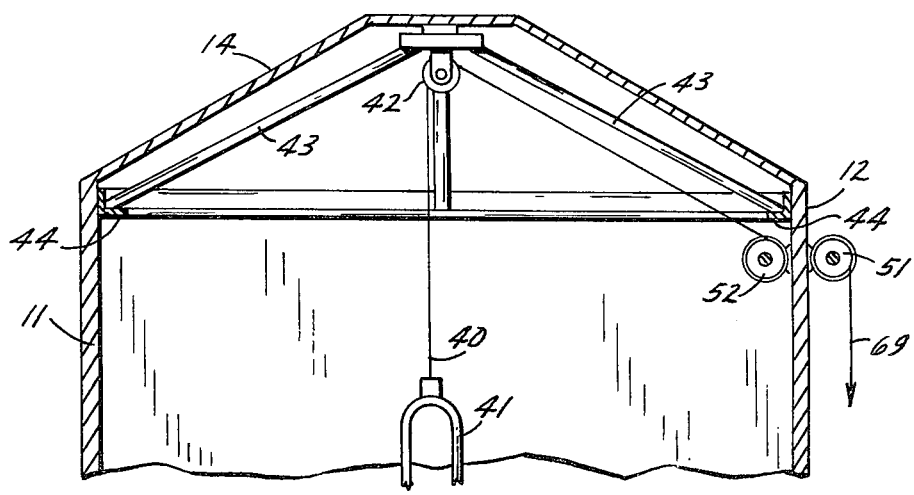
FIG. 6.

3,969,997

SEALED STORAGE UNIT WITH ACCESS

CROSS-REFERENCE TO RELATED APPLICATIONS

This application is a continuation-in-part of application Ser. No. 327,422 filed Jan. 29, 1973, now abandoned.

BACKGROUND OF THE INVENTION

This invention relates to a sealed storage unit for storing animal feed. More particularly, this invention relates to a sealed silo structure which will permit the use of a top unloading unit as well as permit access to the inside of the silo and the unloading chute.

Silo structures of the type concerned with in this invention are described in U.S. Pat. Nos. 2,305,423; 2,551,217; 3,277,812; 3,510,319 and 3,630,001. Sealed silo doors for a temporarily sealed silo are described in U.S. Pat. No. 2,305,423 whereas a pressure compensation means is described in U.S. Pat. No. 2,551, 217 for a sealed silo. An external expansion chamber is illustrated in U.S. Pat. No. 3,277,812 for a sealed silo and likewise in U.S. Pat. Nos. 3,510,319 and 3,630,001. The prior art nowhere teaches a completely sealed silo which can utilize a top unloading unit and do so in a manner that atmospheric oxygen is at all times excluded from the feed. Neither is there available a sealed silo storage unit which will permit access to the inside of the silo as well as the unloading chute for purposes of maintenance and repair. The prior art offers a silo which is left open to the elements or those which require specially made top or bottom unloading units.

It is an object of the present invention to provide a novel sealed storage unit which will permit access to the unit. It is another object of this invention to provide a completely sealed silo which affords removal of the feed from the top of the silo. It is still further object of this invention to provide a combined feed chute and service chute for a silo which is sealed to the silo as well as sealed entrance and exit doors of the chute. It is yet another object of this invention to provide a completely sealed silo for animal feed which is economical to manufacture and adaptable to a wide variety of top unloading mechanisms.

SUMMARY OF THE INVENTION

The foregoing objects are accomplished and the shortcomings of the prior art are overcome by the present silo unit wherein a completely sealed storage structure is adapted to contain a perishable feed with a sealed unloading chute in communication with the interior of the structure and extending downwardly along the outside. An unloading means is positioned at the top of the feed and is constructed to convey the feed from the sealed structure downwardly through the sealed chute. Pressure balancing means are provided to compensate for pressure differentials inside the structure. In a preferred embodiment, the pressure compensating means is a chamber positioned outside the structure and comprises a diaphragmed building with at least one conduit extending between the building and the structure. The sealed unloading chute has spaced access openings along the length of the silo and is disposed adjacent a sealed service chute which affords access to the feed unloading chute. Raising and lowering means for the unloading device are provided outside the structure and at ground level.

BRIEF DESCRIPTION OF DRAWINGS

A better understanding of the present silo unit will be had by reference to the drawing wherein:

FIG. 1 is a view in side elevation of the silo, unloading and service chutes and pressure compensation chamber with portions of the silo and chamber broken away to better illustrate the unloading mechanism in the silo and the pressure compensation means.

FIG. 2 is a partial view in horizontal section taken along line 2—2 of FIG. 1 illustrating the combined unloading and service chutes for the silo.

FIG. 3 is a partial top view taken along line 3—3 of FIG. 1 of the geared spool box for raising and lowering the top unloading means.

FIG. 4 is a view in vertical section taken along line 4—4 of FIG. 1 of the pressure compensating chamber with a portion broken away.

FIG. 5 is a partial view in side elevation with portions broken away showing the interior of the service and unloading chutes as well as a winch for actuating the geared spool box for raising and lowering the unloading mechanism.

FIG. 6 is a partial view of the top of the silo with a portion broken away to show the cable connection to the unloading mechanism.

DESCRIPTION OF THE PREFERRED EMBODIMENT

Proceeding to a detailed description of the present invention, the sealed storage unit is indicated generally by the numeral 10 and comprises a sealed storage structure of the silo type 11 having a cylindrical body portion 12 for containing animal feed 13 such as hay, chopped corn, etc. and is covered by a top conical section 14. Disposed adjacent body portion 12 is a sealed, pressure compensating chamber 15 which like silo 11 has a cylindrical body portion 16 and a conical top 17. Extending transversely across chamber 15 is a flexible diaphragm 19 which is secured in a sealed manner in chamber 15 by means of frame 20 containing fasteners 21. The parts of the diaphragm holder frame 20 which come into contact with the diaphragm 19 will have a lining of rubber or similar gasket material so that as the diaphragm 19 is pulled tightly in place, it will seal and protect the movable diaphragm against abrasion. Two sealed conduits 23 and 24 interconnect in a fluid-tight manner the inside of chamber 15 between diaphragm 19 and the inside of silo 11. A safety vent device 26 located through conical top 17 of pressure compensating chamber 15 serves as a pressure relief valve should pressures in the silo 11 become excessive. Such a safety vent device is of the mechanical low pressure type and available from Fisher Controls, Marshaltown, Iowa. It will permit the exhausting of excessive pressure without substantial entry of outside air.

Disposed inside silo 11 and within cylindrical wall section 12 is the usual chopped hay 13. Resting upon the upper level of the hay 13 is a typical top unloader assembly generally 30 which can be obtained as a standard item from various farm equipment manufacturers such as Fleming Mfg. Co. in Long Lake, Minn.; Badger Northland, Inc. in Kaukauna, Wis., or Patz Material Handling Equipment Company in Pound, Wis. unloader assembly 30 includes the usual auger 31 for conveying feed 13 to a combined motor and impeller type thrower 32 which moves the feed along a curved chute 33 and out through an opening 35 in communication with unloading chute 71. Guide wheels such as 36 ride against the inside of the wall section 12 and drive wheels 38 effect a rotation of the entire unloading assembly 30. A cable 40 is secured to yoke 41 attached to frame 43 of the unloading mechanism 34 to support it from the top 14 of silo 11 by means of pulley 42 rotatably mounted in a standard manner by a triangular framework 43. Angle irons 44 attached to silo wall 12 anchor the framework 43.

The raising and lowering of unloading assembly 30 is in part effected by a double spool and gear box assembly generally 50 which has two spools 51 and 52 journaled by means of shafts 53 and 54, respectively, between side brackets 55 and 56. Gears 57 and 58 on shaft 53 will drive gears 60 and 61 on shaft 54 through idler gears 62 and 67 sealed in wall 12 so that spool 51 in effect drives spool 52. This arrangement of gears 57 and 58 with idler gears 62 and 67 effects a sealed communication with gears 60 and 61 through wall 12 of silo 11. A winch 63 is disposed near the bottom of silo 11 and preferably near ground level. It has a spool 64 rotatably mounted on bracket 65 and rotatable by a crank 66. This is best seen in FIG. 5. Spools 64 and 51 are interconnected by means of cable 69.

As best illustrated in FIG. 2, a combined sealed unloading chute and service chute assembly 70 is shown which extends laterally along the outside of wall section 12 of silo 11. The unloading chute 71 and the service chute 72 are of a generally U-shaped configuration in cross-section having U-shaped wall portions 73 and 74 and a common partition wall 75. Common doors 77 are provided between service chute 72 and unloading chute 71 and are spaced along the entire distance of the chutes 71 and 72. Doors 78 and 79 are also provided in unloading chute 71 and service chute 72, respectively, to close passages 35 and 80 in wall 12 of silo 11. Suitable sealing means such as gaskets provide a seal between doors 78 and 79 and silo wall 12 as well as between common door 77 and partition wall 75. A sealed door 81 is also provided at the exit of unloading chute 71. The usual laddered steps are provided in service chute 72 and cable 69 also extends through the service chute as best shown in FIG. 5.

A sealed loading chute 85 is positioned outside silo wall 12 and is secured by brackets 87. A blower 89 is provided at ground level and chute 85 communicates with the inside of the silo through top 14.

OPERATION

A better understanding of the advantages of the silo storage structure 10 will be had by a description of its operation. Animal feed 13 such as chopped hay will be delivered inside cylindrical silo wall 12 by means of blower 89 and sealed loading chute 85. When the feed 13 reaches a desired level, the unloading means 30 will be lowered by operation of winch 63 through geared spools 51 and 52 which will effect an unwinding of cable 40. A selected door 78 in the unloading chute will be opened which corresponds with the location of passage 35 in the silo wall 12. When it is desired to remove feed 13, the unloading means 30 will be activated by suitable standard electrical controls (not shown) which will preferably be located in the winch 63 and unloading door 81 area. This will cause feed to be conveyed along chute 33 of the unloading means 30, through passage 35 and down through unloading chute 71. Access to the feed chute will be accomplished by opening sealed chute door 81.

It is recognized that, during storage of feed or grain in a sealed structure such as silo 11, internal pressures will build up especially during the day and will be reduced at night. These pressure differentials are compensated for by means of pressure compensating chamber 15 and conduits 23 and 24 without substantial entry of outside air. As pressures increase in silo 11, diaphragm 19 will take the position shown in FIG. 1 and as pressures are reduced, it will assume a position that will make it normal to the floor 27. It is theorized that the use of two conduits 23 and 24 is to give a radiation effect as they are forced by internal pressure down conduit 23 from the uppermost region of silo 11 thereby being cooled and rising up conduit 24. This cooling results in a smaller breathing chamber 15.

As indicated previously, the loading and unloading chutes 85 and 71, respectively, as well as the service chute 72 are completely sealed to prevent oxygen from contacting feed 13. This is accomplished by having various sealed doors 81, 77, 78 and 79 in the unloading and service chutes in sealing engagement with the end of unloading chute 71, the surfaces of silo wall 12 surrounding passages 35 and 80 and on the surface of partition wall 75. Should difficulties occur requiring servicing of unloading mechanism 30, access can be had into silo 11 with proper precautions for breathing by means of sealed service chute doors 79. Intermediate or common doors 77 afford access to the inside of unloading chute 71 should a clogging occur.

It will thus be seen that through the present invention there is now provided a completely sealed silo structure which accommodates a top unloading mechanism. From filling through entire unloading, contact of the feed by atmospheric oxygen is kept to a minimum. Pressure compensation is afforded and access to the inside of the silo is easily afforded. All of these features are provided in a sealed storage structure which can be fabricated and equipped at a minimum of cost and utilizing standard operating equipment.

The silo 11, compensating chamber 15 as well as loading chute 85, unloading chute 71 and service chute 72 with their respective doors are fabricated from steel or coated steel which is highly resistant to silage acids. If desired, other material inpervious to oxygen such as fiberglass or epoxy coated concrete could be substituted. The diaphragm 19 is composed of gas impervious plastic material; however, other flexible rubber or rubberized materials could be substituted. While two conduits 23 and 24 are shown in communication between silo 11 and compensating chamber 15, one such conduit could take the place of both. Neither is it necessary to have the unloading chute 71 and service chute 72 as two separate units; they could be combined if necessary with the requirement that service doors be sealed.

The foregoing invention can now be practiced by those skilled in the art. Such skilled persons will know that the invention is not necessarily restricted to the particular embodiment presented herein. The scope of the invention is to be defined by terms of the following claims as given meaning by the preceding description.

I claim:

1. A sealed storage unit comprising a substantially completely sealed storage structure adapted to contain a perishable material, sealed loading and unloading chutes in communication with the interior and exterior of said structure, unloading means positioned at the top of said perishable material and constructed to convey said material into said unloading chute, raising and lowering means for said unloading means in sealed communication with said sealed storage structure, and a building unit with a diaphragm disposed in said building comprising a pressure balancing means disposed outside and spaced from said storage structure, said diaphragm in fluid communication with the inside of said structure by means of two sealed conduits communicating independently with said structure and said building at different levels, said pressure balancing means effecting pressure balance without substantial entry of outside air, said pressure balancing means being substantially the sole source of communication between the interior of said unit and the outside atmosphere, said sealed storage unit requiring no gas separation means or gas return conduits in communication with said unloading means.

2. A sealed storage unit comprising a substantially completely sealed storage structure adapted to contain a perishable material, sealed loading and unloading chutes in communication with the interior and exterior of said structure, unloading means positioned at the top of said perishable material and constructed to convey said material into said unloading chute, raising and lowering means for said unloading means in sealed communication with said sealed storage structure, said raising and lowering means operable from outside said storage structure and near ground level, said means to raise and lower said unoading means comprising a winch and a geared spool box, and pressure balancing means disposed outside and spaced from said storage structure and communicating with the inside of said structure by means of a sealed conduit, said pressure balancing means effecting pressure balance without substantial entry of outside air, said pressure balancing means being substantially the sole source of communication between the interior of said unit and the outside atmosphere, said sealed storage unit requiring no gas separation means or gas return conduits in communication with said unloading means.

* * * * *